United States Patent
Bae et al.

(10) Patent No.: US 11,124,639 B2
(45) Date of Patent: Sep. 21, 2021

(54) METHOD FOR PREPARING POLYVINYL CHLORIDE

(71) Applicant: LG CHEM, LTD., Seoul (KR)

(72) Inventors: Heung Kwon Bae, Daejeon (KR); Kyung Seog Youk, Daejeon (KR); Jung Rae Lee, Daejeon (KR); Hyun Min Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 298 days.

(21) Appl. No.: 15/565,218

(22) PCT Filed: Sep. 29, 2016

(86) PCT No.: PCT/KR2016/010931
§ 371 (c)(1),
(2) Date: Oct. 9, 2017

(87) PCT Pub. No.: WO2017/069425
PCT Pub. Date: Apr. 27, 2017

(65) Prior Publication Data
US 2018/0057676 A1 Mar. 1, 2018

(30) Foreign Application Priority Data
Oct. 20, 2015 (KR) .......................... 10-2015-0145943

(51) Int. Cl.
*C08L 27/06* (2006.01)
*C08J 3/02* (2006.01)
*C08F 2/24* (2006.01)
*C08F 214/06* (2006.01)
*C08F 36/04* (2006.01)

(52) U.S. Cl.
CPC ................ *C08L 27/06* (2013.01); *C08F 2/24* (2013.01); *C08J 3/02* (2013.01)

(58) Field of Classification Search
CPC .......... C08F 214/06; C08F 36/04; C08F 2/24; C08L 27/06; C08J 3/02
USPC ........................................................ 524/322
See application file for complete search history.

(56) References Cited

U.S. PATENT DOCUMENTS

| | | | | |
|---|---|---|---|---|
| 2,720,510 A | * | 10/1955 | Rothlisberger | ......... C08F 36/04 526/216 |
| 3,370,028 A | * | 2/1968 | De Wald | ................. C08F 18/04 524/156 |
| 3,632,562 A | | 1/1972 | Beier et al. | |
| 4,115,640 A | | 9/1978 | Kalka | |
| 4,133,947 A | | 1/1979 | Kalka et al. | |
| 4,254,105 A | * | 3/1981 | Fukuda | ................ A61K 8/4973 514/762 |
| 5,378,780 A | | 1/1995 | Kruse et al. | |
| 2003/0013828 A1 | | 1/2003 | Shimada et al. | |
| 2012/0309877 A1 | | 12/2012 | Fujiwara et al. | |

FOREIGN PATENT DOCUMENTS

| | | |
|---|---|---|
| CN | 102492310 A | 6/2012 |
| JP | H1036407 A | 2/1998 |
| KR | 2015-0024953 A | 3/2015 |

* cited by examiner

*Primary Examiner* — Ling Siu Choi
*Assistant Examiner* — Ronald Grinsted
(74) *Attorney, Agent, or Firm* — Dentons US LLP

(57) ABSTRACT

The present invention relates to a vinyl chloride-based polymer showing high viscosity properties in a low shear region and showing viscosity and stress decreasing properties in line with the increase of a shear rate, a method for preparing the same, and a plastisol comprising the same. Since the vinyl chloride-based polymer comprises a saponified emulsifier in a specific ratio, high viscosity properties may be shown in a low shear region, and Bingham fluid flow properties may be shown, by which viscosity and stress decrease in line with the increase of a shear rate.

10 Claims, 2 Drawing Sheets

METHOD FOR PREPARING POLYVINYL CHLORIDE

TECHNICAL FIELD

Cross-Reference to Related Applications

The present application is a National Stage Application of International Application No. PCT/KR2016/010931 filed Sep. 29, 2016, which claims the benefit of priority based on Korean Patent Application No. 10-2015-0145943, filed on 20 Oct. 2015, the entire contents of which are incorporated herein by reference.

TECHNICAL FIELD

The present invention relates to a vinyl chloride-based polymer showing high viscosity properties in a low shear region and decreasing properties of viscosity and stress in line with the increase of a shear rate, a method for preparing the same, and a plastisol comprising the same.

BACKGROUND ART

Vinyl chloride-based polymers are a resin comprising at least 50% of vinyl chloride and are used in a variety of applications since they are inexpensive, easy to control hardness, and applicable to most processing apparatuses. Moreover, vinyl chloride-based polymers have excellent physical and chemical properties such as mechanical strength, weather resistance, and chemical resistance, and are thus being widely used in various fields.

Such vinyl chloride-based polymers are prepared in different types according to usage. For example, vinyl chloride-based polymers for straight processing such as an extrusion process, a calendar process, and an injection process are generally prepared by suspension polymerization, and vinyl chloride-based polymers for paste processing such as dipping, spraying, and coating are prepared by emulsion polymerization.

According to the paste processing, a vinyl chloride-based polymer latex for paste processing, obtained by emulsion polymerization is dried by a spray-drying method to form final resin particles, and the particles are dispersed in solvents or plasticizers and applied to products such as floor materials, wall papers, tarpaulins, raincoats, gloves, car under body coatings, sealants, and carpet tiles by processes such as coatings (reverse roll-coating, knife coating, screen coating, spray coating), gravure and screen printing, rotation casting, shell casting and dipping.

The vinyl chloride-based polymers for paste processing solely have low processability and are difficult to apply, and thus, are commonly used after processing in a plastisol type composed of a plasticizer together with various additives such as a thermal stabilizer. In this case, in order to attain excellent processability, it is important to decrease the viscosity of the plastisol to maintain flowability.

In particular, the vinyl chloride-based polymers used as a sealant or a car under body coating are coated on an object via spray coating and undergone a drying process. When the viscosity of the vinyl chloride-based polymers is low, the vinyl chloride-based polymers have flowability and agglomerate in droplets due to gravity or are separated from the object before drying. As a result, the thickness of coating becomes nonuniform, and the vinyl chloride-based polymers are formed thin in a specific portion, thereby generating defects.

In addition, in order to use the vinyl chloride-based polymers in a coating process using spray coating, pseudo-plastic fluid flow properties by which viscosity and stress are decreased in line with the increase of a shear rate are required to be accomplished.

Accordingly, in order to use the vinyl chloride-based polymer for a sealant or a car under body coating via a coating process using a paste processing, for example, spray coating, development of vinyl chloride-based polymers showing high viscosity properties in a region where a shear rate is low or a shear rate is zero, and showing decreasing viscosity and stress properties according to the increase of a shear rate is required.

DISCLOSURE OF THE INVENTION

Technical Problem

The present invention has been devised in consideration of the above-mentioned problems, and the object of the present invention is to provide a vinyl chloride-based polymer showing Bingham fluid flow properties by which high viscosity properties are shown in a low shear region and Bingham fluid flow properties of decreasing viscosity and stress according to the increase of a shear rate are shown.

Another object of the present invention is to provide a method for preparing the vinyl chloride-based polymer.

Still another object of the present invention is to provide a plastisol comprising the vinyl chloride-based polymer.

Technical Solution

To solve the above-described tasks, the present invention provides a vinyl chloride-based polymer comprising 0.5 parts by weight to 2.0 parts by weight of a saponified emulsifier based on 100 parts by weight of a polymer, wherein the saponified emulsifier is a saponified fatty acid having 12 or more carbon atoms.

In addition, the present invention provides a method for preparing the vinyl chloride-based polymer, comprising emulsion polymerizing a vinyl chloride-based monomer in the presence of a saponified emulsifier, wherein the saponified emulsifier is a saponified fatty acid having 12 or more carbon atoms.

Also, the present invention provides a plastisol comprising the vinyl chloride-based polymer.

Advantageous Effects

The vinyl chloride-based polymer according to the present invention comprises a saponified emulsifier in a specific ratio and may show high viscosity properties in a low shear region and show Bingham fluid flow properties, by which viscosity and stress decrease according to the increase of a shear rate.

In addition, according to the method for preparing a vinyl chloride-based polymer according to the present invention, emulsion polymerization is performed in the presence of a saponified emulsifier, and the vinyl chloride-based polymer thus prepared may comprise the saponified emulsifier in a specific ratio, and the vinyl chloride-based polymer thus prepared may show Bingham fluid flow properties, thereby being readily used in a spray coating process, or the like.

Accordingly, the vinyl chloride-based polymer and the method for preparing the same according to the present invention may be easily applied to industries requiring thereof, for example, to a vinyl chloride-based resin industry for paste processing.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

BEST MODE FOR CARRYING OUT THE INVENTION

Figure 1:
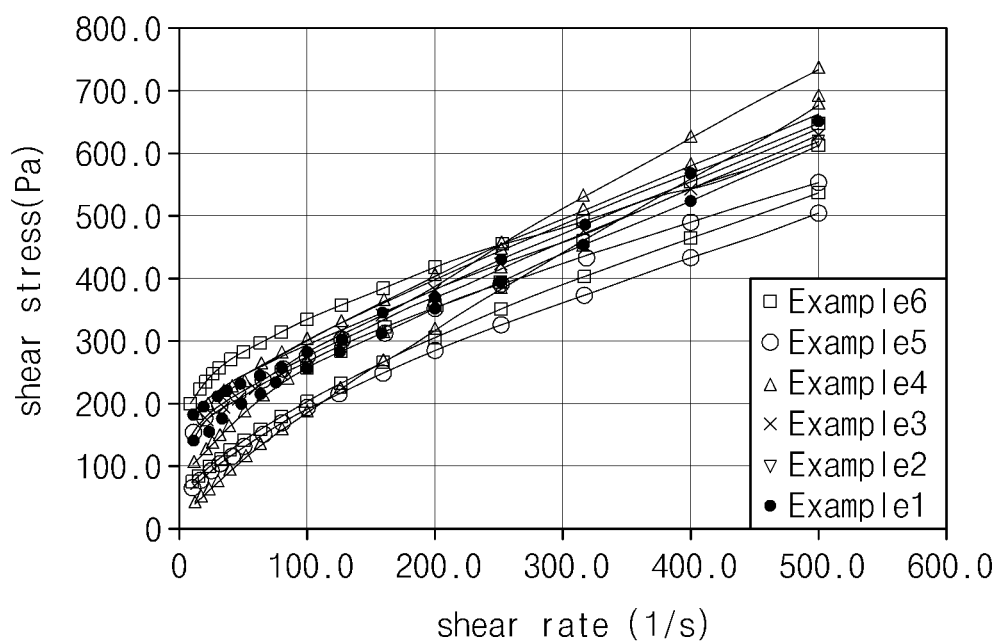
FIG. 1 is a graph illustrating stress change in accordance with the shear rate of the vinyl chloride-based polymers of Example 1 to Example 6 according to exemplary embodiments of the present invention.

Hereinafter, the present invention will now be described in more detail referring to examples and experimental examples in order to assist the understanding of the present invention. However, the following examples and experimental examples are only for illustrating the present invention and the scope of the present invention is not limited thereto.

Example 1

To a 500 L high pressure reactor, 100 parts by weight of polymerization water, 0.02 parts by weight of sodium lauryl sulfate, 0.062 parts by weight of potassium persulfate, and 1.25 parts by weight of vinyl chloride seeds with a particle size of 0.6 μm were injected, and vacuum was applied to the reactor while stirring. To the reactor in a vacuum state, 100 parts by weight of a vinyl chloride monomer was injected, the temperature of the reactor was elevated to 54° C., and polymerization was initiated. After initiating polymerization, 0.6 parts by weight of saponified myristic acid was continuously injected to the reactor for 6 hours. Then, the reaction was finished when a polymerization conversion ratio was 85%, and unreacted vinyl chloride monomer was recovered and removed to obtain a vinyl chloride polymer latex. The latex thus obtained was spray dried to obtain a granular vinyl chloride polymer (average particle diameter of 0.28 μm). In this case, the saponified myristic acid was prepared by adding 1.007 mol of myristic acid and 1 mol of potassium hydroxide to deionized water one by one and conducting saponification reaction at 70° C. for 1 hour. The acidity (pH) thereof was 11.

Example 2

A vinyl chloride polymer was obtained by conducting the same method as Example 1 except for using a mixture of saponified palmitic acid and stearic acid (in 6:4 molar ratio) instead of the saponified myristic acid. In this case, the mixture of saponified palmitic acid and stearic acid was prepared by adding 1.007 mol of the mixture of palmitic acid and stearic acid (in 6:4 molar ratio) and 1 mol of potassium hydroxide to deionized water one by one, and conducting saponification reaction at 70° C. for 1 hour. The acidity (pH) thereof was 11.

Example 3

A vinyl chloride polymer was obtained by conducting the same method as Example 2 except for using the palmitic acid and the stearic acid in the mixture of the saponified palmitic acid and stearic acid, in a molar ratio of 4:6.

Example 4

A vinyl chloride polymer was obtained by conducting the same method as Example 1 except for using saponified lauric acid instead of the saponified myristic acid.

Example 5

A vinyl chloride polymer was obtained by conducting the same method as Example 1 except for using saponified myristic acid having an acidity (pH) of 10. In this case, the saponified myristic acid was prepared by adding 1.075 mol of myristic acid and 1 mol of potassium hydroxide to deionized water one by one, and conducting saponification reaction at 70° C. for 1 hour.

Example 6

A vinyl chloride polymer was obtained by conducting the same method as Example 1 except for using saponified myristic acid having an acidity (pH) of 12. In this case, the saponified myristic acid was prepared by adding 0.997 mol of myristic acid and 1 mol of potassium hydroxide to deionized water one by one, and conducting saponification reaction at 70° C. for 1 hour.

Comparative Example 1

A vinyl chloride polymer was obtained by conducting the same method as Example 1 except for using sodium lauryl sulfate instead of the saponified myristic acid.

Comparative Example 2

A vinyl chloride polymer was obtained by conducting the same method as Example 1 except for using unsaponified myristic acid instead of the saponified myristic acid.

Comparative Example 3

A vinyl chloride polymer was obtained by conducting the same method as Example 1 except for using saponified myristic acid having an acidity (pH) of 9.5 instead of the saponified myristic acid having an acidity (pH) of 10.

Comparative Example 4

A vinyl chloride polymer was obtained by conducting the same method as Example 1 except for using saponified myristic acid having an acidity (pH) of 12.5 instead of the saponified myristic acid having an acidity (pH) of 10.

Comparative Example 5

A vinyl chloride polymer was obtained by conducting the same method as Example 1 except for using saponified caprylic acid instead of the saponified myristic acid.

Comparative Example 6

A vinyl chloride polymer was obtained by conducting the same method as Example 1 except for using saponified arachidic acid instead of the saponified myristic acid.

Experimental Example 1

To verify the amount of the saponified emulsifier in each of the vinyl chloride-based polymers prepared in Example 1, Example 5 and Example 6, analysis was conducted using liquid chromatography. The results are shown in Table 1 below.

The liquid chromatography analysis was conducted using HPLC (Agilent 1100 series HPLC value system, Agilent Technologies Co., Ltd.) equipped with a diode array detector (DAD), and the amount of the saponified emulsifier was verified by using mass spectrometry detection (MSD). Particularly, 0.5 g of each of the vinyl chloride-based polymers was dissolved in tetrahydrofuran (THF) and was precipitated using methanol, and supernatant was filtered to prepare each specimen. Using each specimen thus prepared, DAD was set to a wavelength of 210 nm, a flow rate of 1 ml/min, and analysis time of 25 minutes, and HPLC analysis was conducted using a 4.6×50 mm RRHT column. The injection volume of the specimen was 2 µl. In addition, MSD was recorded in an API-ESI NI mode to m/z of 200-1000.

TABLE 1

| Division | Saponified emulsifier (ppm) |
| --- | --- |
| Example 1 | 6012 |
| Example 5 | 5801 |
| Example 6 | 5950 |

As shown in Table 1, the vinyl chloride polymers of Example 1, Example 5 and Example 6 according to exemplary embodiments of the present invention were confirmed to comprise a certain amount of a saponified emulsifier.

Experimental Example 2

Figure 2:
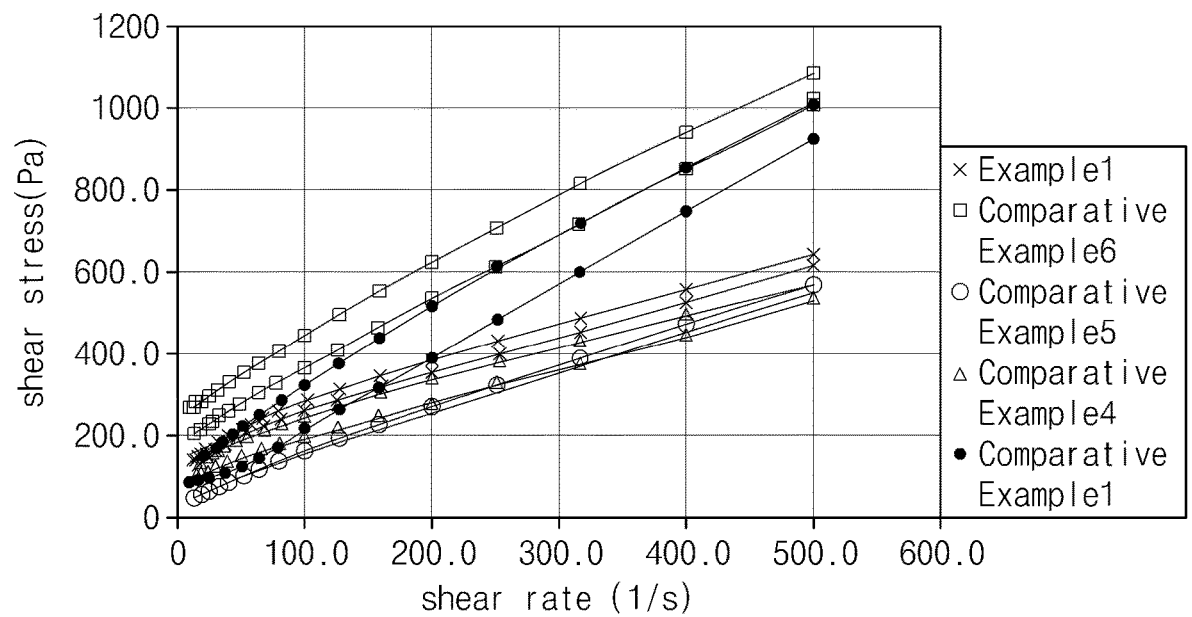
FIG. 2 is a graph illustrating stress change in accordance with the shear rate of the vinyl chloride-based polymer of Example 1 according to an embodiment of the present invention, and the vinyl chloride-based polymers of Comparative Example 1 and Comparative Examples 4 to 6.

In order to compare and analyze the viscosity and flow properties of each of the vinyl chloride polymers prepared in Example 1 to Example 6 and Comparative Example 1 to Comparative Example 6, the viscosity properties, flow properties and latex stability according to the shear rate of each vinyl chloride polymer were analyzed. The results are shown in Table 2 below, and FIGS. 1 and 2.

First, 100 g of each vinyl chloride polymer and 120 g of dioctylphthalate (DOP) were stirred using a Werke mixer (EUROSTAR IKA) in a rate of 800 rpm for 10 minutes to prepare each plastisol.

1) Flow and Viscosity Properties

Flow properties and viscosity properties of each plastisol were measured by using Rheometer (AR2000EX peltier plate, TA Instruments Co., Ltd.) with a test fixture of 40 mm parallel plate with a measurement gap of 500 µm. In this case, the measurement was conducted by a first step of adjusting a shear rate to 10 s-1 for 30 seconds, a second step of elevating the shear rate from 10 s-1 to 500 s-1 for 120 seconds, a third step of maintaining the shear rate at 500 s-1 for 180 seconds, and a fourth step of decreasing the shear rate from 500 s-1 to 10 s-1 for 120 seconds.

2) Latex Stability

To a 500 ml beaker, 220 ml of each of the vinyl chloride polymer latexes prepared in Example 1 to Example 6 and Comparative Example 1 to Comparative Example 6 was injected, and 30 ml of dichloroethylene was added thereto, followed by stirring using Werke mixer (EUROSTAR IAK) in a rate of 1,000 rpm. Then, time required for agglomeration was measured.

TABLE 2

| Division | Yield stress (at 10 s-1, Pa) | Stress (at 500 s-1, Pa) | Latex stability (s) |
| --- | --- | --- | --- |
| Example 1 | 159 | 641 | ≧300 |
| Example 2 | 183 | 663 | ≧300 |
| Example 3 | 205 | 648 | ≧300 |
| Example 4 | 99 | 735 | ≧300 |
| Example 5 | 139 | 553 | ≧300 |
| Example 6 | 203 | 606 | ≧300 |
| Comparative Example 1 | 99 | 1013 | ≧300 |
| Comparative Example 2 | — | — | Polymer not formed |
| Comparative Example 3 | — | — | 32 seconds |
| Comparative Example 4 | 123 | 566 | ≧300 |
| Comparative Example 5 | 39 | 565 | ≧300 |
| Comparative Example 6 | 263 | 1086 | ≧300 |

As shown in Table 2, it was secured that the vinyl chloride-based polymers of Example 1 to Example 6 according to exemplary embodiments of the present invention showed better latex stability, high viscosity properties in a low shear region, and relatively low viscosity properties in a high shear region overall when compared to those of the vinyl chloride-based polymers of Comparative Example 1 to Comparative Example 6. Meanwhile, stress is generally represented by viscosity with respect to a shear rate. For example, the relation of a stress, a shear rate and a viscosity is represented by Mathematical Equation 1 below.

Shear stress=Shear rate×Viscosity [Mathematical Equation 1]

Accordingly, it can be secured that as the stress increases at the same shear rate, the viscosity increases. In addition, yield stress represents a critical stress value for initiating flow, and the higher the yield stress is, the higher the viscosity is.

In particular, it was secured that the yield stress in a low shear region was decreased up to 47% degree and the stress in a high shear region was increased to minimum 137% degree and maximum 183% degree for the vinyl chloride-based polymer of Comparative Example 1 prepared not using the saponified fatty acid according to the present invention but using the conventional emulsifier, when compared to the vinyl chloride-based polymers of Example 1 to Example 6. The vinyl chloride-based polymers of Example 1 to Example 6 showed markedly increased viscosity properties in a low shear region and relatively lower viscosity properties in a high shear region when compared to those of the vinyl chloride-based polymer of Comparative Example 1.

In addition, the vinyl chloride-based polymer of Comparative Example 4 prepared using a saponified emulsifier (pH 12.5, saponified myristic acid) of which acidity was deviated from the pH range suggested in the present invention showed similar degree of stress in a high shear region and markedly lower yield stress of 60% degree in a low shear region when compared to those of the vinyl chloride-based polymer of Example 6 (pH 12, saponified myristic acid). That is, the vinyl chloride-based polymer of Example 6 showed significantly excellent high viscosity properties in a low shear region and similar degree of low viscosity properties in a high shear region when compared to those of the vinyl chloride-based polymer of Comparative Example 4.

Also, the vinyl chloride-based polymers of Comparative Examples 5 and 6 prepared using a saponified emulsifier but a fatty acid with less carbon number than suggested carbon number range in the present invention, showed markedly lower yield stress in a low shear region or markedly increased stress in a high shear region when compared to the vinyl chloride polymer of Example 1.

Meanwhile, with the vinyl chloride-based polymer of Comparative Example 2 prepared using an unsaponified myristic acid and the vinyl chloride-based polymer of Comparative Example 3 prepared using saponified myristic acid with pH 9.5 which was lower than the pH range suggested in the present invention, a polymer chain was not properly formed and the measurement of stress properties according to the shear region was impossible.

MODE FOR CARRYING OUT THE INVENTION

Hereinafter, the present invention will be explained in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a vinyl chloride-based polymer which may exhibit high viscosity flow properties in a low shear region.

Vinyl chloride-based polymers are applied in various fields, and are prepared for straight processing or paste processing according to the application field thereof. Vinyl chloride-based polymers for the paste processing are dispersed in a solvent or a plasticizer to prepare a plastisol, and are applied to various products such as a sealant and a car under body coating via a process such as spray coating.

In this case, if the viscosity of the vinyl chloride-based polymers is low, the vinyl chloride-based polymers may have flowability after coating and before drying, and the thickness of coating becomes nonuniform, and the vinyl chloride-based polymers are formed thin in a specific portion, thereby generating defects.

In addition, in order to use the vinyl chloride-based polymer in spray coating, flow properties such as pseudoplastic fluid by which viscosity and stress are decreased according to the increase of a shear rate are required to accomplish.

Accordingly, the present invention provides a vinyl chloride-based polymer which can show high viscosity properties in a region where a shear rate is low or zero, and show flow properties of decreasing viscosity and stress in line with the increase of a shear rate.

The vinyl chloride-based polymer according to an embodiment of the present invention is characterized in comprising from 0.5 parts by weight to 2.0 parts by weight of a saponified emulsifier based on 100 parts by weight of the vinyl chloride-based polymer, wherein the saponified emulsifier is a saponified fatty acid having 12 or more carbon atoms.

The vinyl chloride-based polymer may be prepared using a vinyl chloride-based monomer by a subsequently explained preparation method. That is, the vinyl chloride-based polymer according to an embodiment of the present invention may comprise a derived unit of a vinyl chloride-based monomer and a saponified emulsifier.

The terms "derived unit" used in the present invention may denote a structure or a component derived from a certain material, or may denote the material itself. For example, the derived unit of the vinyl chloride-based monomer may denote a structure or a component originated from a vinyl chloride-based monomer, or the vinyl chloride-based monomer itself.

The vinyl chloride-based monomer may purely mean vinyl chloride monomer alone or a mixture of a vinyl chloride monomer and a vinyl-based monomer copolymerizable therewith. That is, the vinyl chloride-based polymer according to an embodiment of the present invention may comprise a derived unit from a vinyl chloride alone or a derived unit from a mixture of a vinyl chloride monomer and a vinyl-based monomer copolymerizable therewith. If the derived unit from the vinyl chloride-based monomer is the derived unit of the mixture, vinyl chloride may be comprised in an amount of 50% or more.

Examples of the vinyl-based monomer which is copolymerizable with the vinyl chloride monomer may comprise, but not limited to, olefin compounds such as ethylene, propylene and butene; vinyl esters such as vinyl acetate, vinyl propionate and vinyl stearate; unsaturated nitriles such as acrylonitrile; vinyl alkyl ethers such as vinyl methyl ether, vinyl ethyl ether, vinyl octyl ether and vinyl lauryl ether; vinylidene halides such as vinylidene chloride; unsaturated fatty acids such as acrylic acid, methacrylic acid, itaconic acid, maleic acid, fumaric acid, maleic anhydride and itaconic anhydride, and anhydrides of these fatty acids; unsaturated fatty acid esters such as methyl acrylate, ethyl acrylate, monomethyl maleate, dimethyl maleate and butyl benzyl maleate; and crosslinkable monomers such as diallyl phthalate, and the above-mentioned vinyl-based monomers may be used alone or as a mixture of two or more thereof.

The saponified emulsifier according to an embodiment of the present invention may be a saponified fatty acid with 12 or more carbon atoms, and the acidity (pH) thereof may be 10 to 12.

The term "acidity (pH)" in the present disclosure is the measure for assessing the acidity of a material and is represented by an index of a hydrogen ion concentration. In addition, in the present invention, the acidity may mean the saponification degree of a saponified emulsifier. For example, if the acidity is in the range, the saponification degree of a saponified emulsifier may be 90% or more.

If the acidity (pH) of the saponified emulsifier is less than 10, the saponification of the saponified emulsifier may not be satisfactorily conducted, and the saponified emulsifier may not be dispersed but agglomerated, thereby deteriorating the physical properties of the vinyl chloride-based polymer such as processability. In contrast, if the acidity (pH) of the saponified emulsifier is greater than 12, the polymer chain of a vinyl chloride-based polymer comprising thereof may not be formed properly.

The fatty acid may be a linear chain or a branched chain, and may particularly be a fatty acid with 14 to 18 carbon atoms. More particularly, the fatty acid may be at least one selected from the group consisting of lauric acid, myristic acid, palmitic acid and stearic acid.

In addition, the vinyl chloride-based polymer according to an embodiment of the present invention may comprise from 0.5 parts by weight to 2.0 parts by weight of a saponified emulsifier based on 100 parts by weight of the polymer as described above. In this case, the saponified emulsifier may be present in a dispersed phase in the vinyl chloride-based polymer.

The terms "dispersed phase" in the present disclosure represent a phase constituting particles when a material composing a colloidal dispersion system is separated into two comprising a phase constituting particles and a phase constituting a medium (continuous phase). For example, in the vinyl chloride-based polymer, the derived unit of the vinyl chloride-based monomer is present in a continuous phase, and the saponified emulsifier is present in a dispersed phase.

The vinyl chloride-based polymer according to an embodiment of the present invention comprises the saponified emulsifier, and may shown high viscosity properties in a low shear region or in a region where a shear rate is zero.

In addition, the present invention provides a method for preparing the vinyl chloride-based polymer.

The preparation method according to an embodiment of the present invention is characterized in comprising emulsion polymerizing a vinyl chloride-based monomer in the presence of a saponified emulsifier.

The saponified emulsifier may be a saponified fatty acid with 12 or more carbon atoms as described above and may be used in an amount of 0.6 parts by weight to 2.0 parts by weight based on 100 parts by weight of the vinyl chloride-based monomer. Particular fatty acids are the same as described above.

Meanwhile, the saponified emulsifier may be prepared by adding a fatty acid with 12 or more carbon atoms and an alkaline solution to deionized water of 70° C. and conducting saponification reaction. In this case, the alkaline solution may be sodium hydroxide (NaOH), potassium hydroxide (KOH), or a combination thereof, and the alkaline solution may be used in a molar ratio of 0.93 mol to 1.003 mol based on 1 mol of the fatty acid.

The saponified emulsifier according to an embodiment of the present invention may be prepared by the above-described method and show the above-described acidity (pH).

The vinyl chloride-based monomer may be pure vinyl chloride monomer alone or a mixture of a vinyl chloride monomer and a vinyl-based monomer which is copolymerizable therewith. Particular vinyl-based monomers are as described above.

The emulsion polymerization is not specifically limited, but may be conducted by injecting a vinyl chloride-based monomer to a vacuum reactor filled with a saponified emulsifier and polymerizing. In this case, a separate emulsifier may be additionally injected after initiating polymerization, and the separate emulsifier may be continuously injected during polymerization.

Here, the vacuum reactor filled with the saponified emulsifier may denote a reactor comprising a saponified emulsifier, and additives such as a water soluble polymerization initiator, a dispersant, and an electrolyte may be further filled in addition to the saponified emulsifier as needed.

The water soluble polymerization initiator may be used in an amount of 0.01 parts by weight to 2.0 parts by weight based on 100 parts by weight of the vinyl chloride-based monomer, without limitation. The water soluble polymerization initiator is not specifically limited, but may be at least one selected from the group consisting of potassium persulfate, ammonium persulfate, and hydrogen peroxide.

The separate emulsifier may be used in an amount of 0.01 parts by weight to 6.0 parts by weight based on 100 parts by weight of the vinyl chloride-based monomer, without limitation. In addition, the separate emulsifier may be the same as or different from the saponified emulsifier. Different emulsifier may be at least one selected from the group consisting of sodium lauryl sulfate, lauryl benzene sulfonic acid, alpha-olefine sulfonate, sodium lauryl ethoxylated sulfate, sodium octadecyl sulfate, sodium lauryl ether sulfate, and linear alkylbenzene sulfonate.

The electrolyte may be used in an amount of 0.0001 parts by weight to 3.0 parts by weight based on 100 parts by weight of the vinyl chloride-based monomer, without limitation. The electrolyte may be at least one selected from the group consisting of potassium chloride, sodium chloride, potassium bicarbonate, sodium carbonate, potassium carbonate, potassium bisulfite, sodium hydrogen sulfite, tetrapotassium pyrophosphate, tetrasodium pyrophosphate, tripotassium phosphate, trisodium phosphate, dipotassium hydrogen phosphate, and disodium hydrogen phosphate.

The polymerization water may be used in an amount of 70 parts by weight to 120 parts by weight based on 100 parts by weight of the vinyl chloride-based monomer and may be deionized water.

The emulsion polymerization is not specifically limited, and may be conducted at a temperature, for example, 30° C. to 70° C.

In addition, the preparation method according to an embodiment of the present invention may further comprise at least one step of dehydrating, washing and drying after the emulsion polymerization.

Also, the present invention provides a plastisol comprising the vinyl chloride-based polymer.

The plastisol according to an embodiment of the present invention may further comprise from 40 parts by weight to 120 parts by weight of a plasticizer based on 100 parts by weight of the vinyl chloride-based polymer, and may further comprise an additive such as a dispersion diluent, a thermal stabilizer, a viscosity adjusting agent and a foaming agent as needed.

The term "plastisol" used in the present invention denotes a mixture of a resin and a plasticizer for molding, casting, or processing to a continuous film phase by heating, for example, a mixed paste phase of a vinyl chloride-based polymer and a plasticizer.

The term "plasticizer" used in the present invention may denote an organic additive material which plays the role of improving molding processability of the resin at a high temperature by adding thereof to a thermoplastic resin to increase thermal plasticity.

The plasticizer and the additive are not specifically limited and common materials known in the art may be used.

Further, the present invention provides a processed product manufactured by using the plastisol.

The processed products may be paste products manufactured by paste processing the plastisol.

The invention claimed is:

1. A vinyl chloride-based polymer comprising:
   0.5 parts by weight to 2.0 parts by weight of a saponified emulsifier based on 100 parts by weight of a polymer,
   wherein the saponified emulsifier is a saponified fatty acid having 12 or more carbon atoms, wherein acidity (pH) of the saponified emulsifier is 10 to 12, and the saponification degree of the saponified emulsifier is 90% or more, and a separate emulsifier, wherein the separate emulsifier is at least one selected from the group consisting of sodium lauryl sulfate, lauryl benzene sulfonic acid, alpha-olefin sulfonate, sodium lauryl ethoxylated sulfate, sodium octacecyl sulfate, sodium lauryl ether sulfite, and linear alkyl benzene sulfonate.

2. The vinyl chloride-based polymer of claim 1, wherein the fatty acid is a linear chain or a branched chain.

3. The vinyl chloride-based polymer of claim 1, wherein the fatty acid is a fatty acid having from 14 to 18 carbon atoms.

4. The vinyl chloride-based polymer of claim 1, wherein at least a portion of the saponified emulsifier is present in a dispersed phase in the vinyl chloride-based polymer.

5. A method for preparing the vinyl chloride-based polymer according to claim 1, the method comprising:

emulsion polymerizing a vinyl chloride-based monomer in the presence of a saponified emulsifier, wherein the saponified emulsifier is a saponified fatty acid having 12 or more carbon atoms, and wherein acidity (pH) of the saponified emulsifier is 10 to 12 and the saponification degree of the saponified emulsifier is 90% or more.

6. The method for preparing the vinyl chloride-based polymer of claim 5, wherein the fatty acid is at least one selected from the group consisting of lauric acid, myristic acid, palmitic acid, and stearic acid.

7. The method for preparing the vinyl chloride-based polymer of claim 6, wherein the saponified emulsifier is used in an amount of 0.6 parts by weight to 2.0 parts by weight based on 100 parts by weight of the vinyl chloride-based monomer.

8. The method for preparing the vinyl chloride-based polymer of claim 5, wherein the emulsion polymerization is conducted at temperature from 30° C. to 70°.

9. A plastisol comprising the vinyl chloride-based polymer of claim 1.

10. The plastisol of claim 9, further comprising a plasticizer in an amount of 40 parts by weight to 120 parts by weight based on 100 parts by weight of the vinyl chloride-based polymer.

* * * * *